United States Patent [19]

Aspinwall

[11] Patent Number: 4,457,341
[45] Date of Patent: Jul. 3, 1984

[54] VARIABLE PRESSURE DROP PROPORTIONAL MOTOR CONTROLLED HYDRAULIC DIRECTIONAL VALVE

[75] Inventor: Ronald A. Aspinwall, Detroit, Mich.
[73] Assignee: Vickers, Incorporated, Troy, Mich.
[21] Appl. No.: 354,742
[22] Filed: Mar. 4, 1982
[51] Int. Cl.³ .......................................... F15B 13/044
[52] U.S. Cl. .......................... 137/625.48; 137/614.17; 137/625.65; 137/625.68; 251/137; 251/285; 251/325
[58] Field of Search ...................... 137/614.17, 625.48, 137/625.65, 625.68; 251/137, 285, 325

[56] References Cited

U.S. PATENT DOCUMENTS

| | | | |
|---|---|---|---|
| 1,822,668 | 9/1931 | Protzeller | 251/285 X |
| 2,502,573 | 4/1950 | Lee | 251/285 X |
| 2,619,118 | 11/1952 | Adams | 137/625.68 |
| 2,630,136 | 3/1953 | Brandes et al. | 251/137 X |
| 2,757,642 | 8/1956 | Raney | 137/625.68 |
| 2,930,404 | 3/1960 | Kowalski et al. | 251/285 X |
| 2,964,023 | 12/1960 | Meulendyk | 137/625.68 |
| 3,076,476 | 2/1963 | Campbell | 137/625.68 |
| 3,106,938 | 10/1963 | Gordon | 137/625.68 X |
| 3,123,335 | 3/1964 | Darling | 251/325 X |
| 3,511,469 | 5/1970 | Bell | 251/285 X |
| 3,550,631 | 12/1970 | Vanderlaan et al. | 137/625.65 |
| 3,565,110 | 2/1971 | Hodgson | 137/625.68 X |
| 3,744,523 | 7/1973 | Hill | 137/625.68 |
| 4,074,700 | 2/1978 | Engle | 137/625.65 X |
| 4,133,348 | 1/1979 | Spitz | 137/625.68 X |
| 4,286,770 | 9/1981 | Jackson | 251/285 |
| 4,311,170 | 1/1982 | Dolan | 137/614.17 |

Primary Examiner—Gerald A. Michalsky
Attorney, Agent, or Firm—Barnes, Kisselle, Raisch, Choate, Whittemore & Hulbert

[57] ABSTRACT

A variable pressure drop proportional motor controlled directional valve comprising a valve body, a bore in the body, and a cylindrical spool slideable in the bore. A force motor is operatively connected to the spool for moving the spool. The body has a pressure inlet port extending to the bore and spaced outlet ports extending to the bore on opposite sides of said pressure port. The spool has an axial passage and generally radial passages such that when the spool is moved, the radial passages will provide communication between the pressure inlet port and one of the outlet ports. A member is adjustably positioned in the spool for varying the orifice area to at least one of the radial passages so that the pressure drop between the axial passage and the radial passage can be adjustably varied.

11 Claims, 8 Drawing Figures

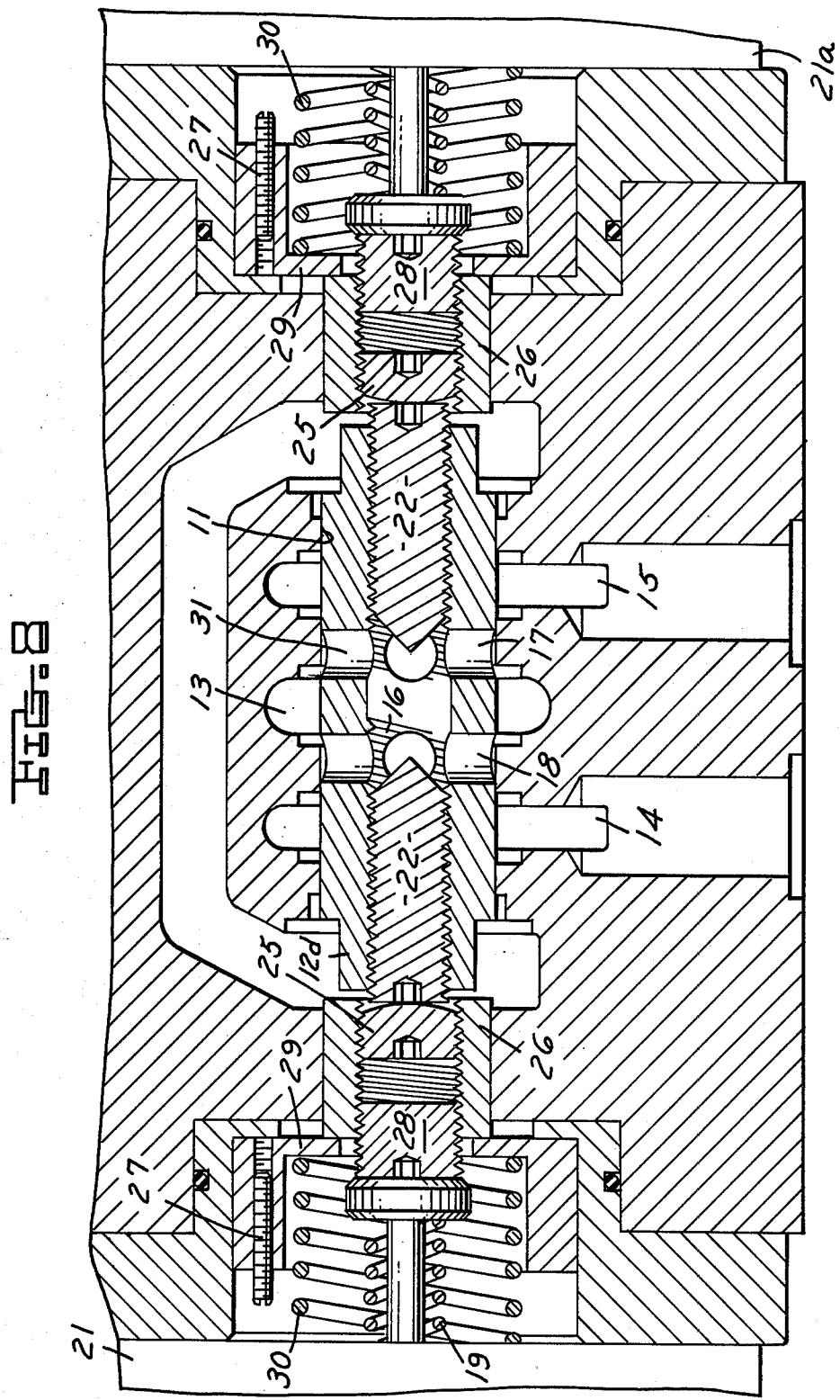

VARIABLE PRESSURE DROP PROPORTIONAL MOTOR CONTROLLED HYDRAULIC DIRECTIONAL VALVE

This invention relates to motor controlled directional valves such as solenoid controlled directional valves.

Background and Summary of the Invention

In the control of remotely positioned cylinders and motors, it has been common to use various devices such as on/off solenoids, flexible cables, cams, mechanical linkages, pilot valves and servo valves. Each of these methods of control has disadvantages. For example, cables and linkages are cumbersome and require expensive cams, pilot hydraulics require extra piping and valving, solenoids are not capable of providing good metering, and servo valves are often expensive.

It has heretofore been suggested that a hydraulic proportional motor controlled direction valve be used and such valves have been used satisfactorily. Such valves comprise a valve body having a bore in which a spool is slideable. The body has a pressure inlet port extending to the bore and spaced outlet ports extending to the bore on opposite sides of the pressure inlet port. The spool is formed with annular lands such as when the spool is moved, communication is provided between the pressure inlet port and one of the outlet ports. The spool is operatively connected to a proportional force motor such as a solenoid or a pair of solenoids.

In such an arrangement, the valve is designed for operation under certain limited conditions of flow and pressure drop. In order to utilize the valve in situations where the desired flow or pressure drop is not possible, changes must be made such as utilizing a different spool or adding other controls.

In my copending U.S. application Ser. No. 268,489 filed May 29, 1981 now U.S. Pat. No. 4,422,475, there is disclosed a directional valve wherein a sleeve is interposed between the bore and the spool. The spool controls flow through the sleeve to the outlet ports and the sleeve includes a bypass channel whereby upon shifting movement of the sleeve relative to the body, the sleeve will permit increased flow to the selected outlet ports.

Among the objectives of the present invention are to provide a hydraulic proportional motor controlled valve wherein the flow and pressure drop can be adjusted to accommodate different conditions without making changes in the valve or adding other controls or devices to the hydraulic system; wherein the valve has repeatability, that is, the spool will be moved to the same position by a predetermined operation of the force motor of the valve; wherein the valve has low hysteresis and wherein the null position of the spool can be readily adjusted.

In accordance with the invention, the variable pressure drop proportional motor controlled directional valve comprises a valve body, a bore in the body, a cylindrical spool slideable in the bore, and a force motor is operatively connected to the spool for moving the spool. The body has a pressure inlet port extending to the bore and spaced outlet ports extending to the bore on opposite sides of the pressure port. The spool has an axial passage and generally radial passages such that when the spool is moved, the radial passages will provide communication with the pressure inlet port and one of the outlet ports. A member is adjustably positioned in the spool for varying the orifice area to at least one of the radial passages so that the pressure drop between the axial passage chamber and the radial passage can be adjustably varied.

DESCRIPTION OF THE DRAWINGS

FIG. 8 is a part sectional view of a modified form of valve.

DESCRIPTION

Figure 1:
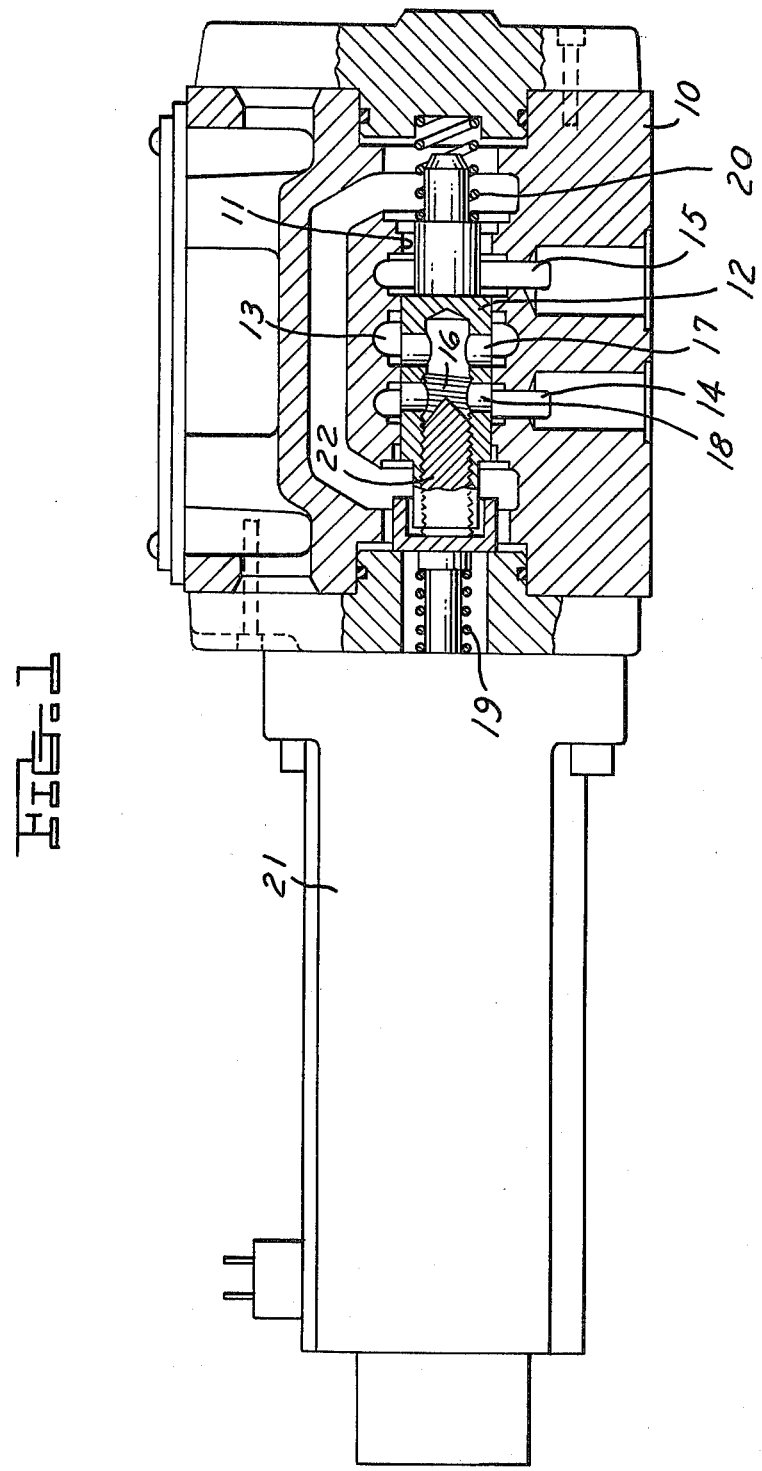
FIG. 1 is a part sectional longitudinal view through a variable pressure drop proportional motor controlled directional valve embodying the invention.

Referring to FIG. 1, the variable pressure drop proportional motor controlled directional valve embodying the invention comprises a valve body 10 having a cylindrical spool 12 slideable in the bore. The valve body 10 includes an annular pressure inlet port 13 extending to the bore 11 and spaced annular outlet ports 14, 15 on opposite sides of the pressure port 13. The spool 12 has an axial passage 16 and generally radial passages 17, 18 such that when the spool is moved, the radial passages will provide communication between the pressure inlet port 13 and one of the outlet ports 14, 15. As shown in FIG. 1, the spool is in position for permitting flow from inlet port 13 to outlet port 14. In the neutral position, the spool is maintained in center position by spring 19, 20 and is moved by a force motor 21.

In this form, the outlet port 15 is not utilized. The force motor 21 is of the type which moves the spool 12 to a selected position in the bore depending on the input signal. Preferably the force motor comprises a solenoid wherein the stroke of the solenoid is proportional to the input current of the solenoid. Merely increasing or decreasing the input current of the solenoid enables positioning of the plunger and, in turn, the spool at any point along its stroke to control the fluid flow through the directional valve.

A feedback device, such as a linear variable differential transformer, commonly known as an LVDT, is incorporated in the servo solenoid when increased accuracy and repeatability is desired. The LVDT monitors the armature position. The electronic circuitry compares the input signal with the feedback signal of the LVDT and eliminates any error signal between the two. Thus, by monitoring the armature position, the spool position is known for a given input signal to the solenoid and the spool position is always the same with regard to that input signal. This allows for repeatability of the spool position in comparison to the electrical input signal to the solenoid.

Servo solenoids of the type discussed above are described in U.S. Pat. No. 4,044,324 and in Catalog No. SS-1104 dated October, 1979, published by Ledex Inc. of Vandalia, Ohio, USA.

Figure 2:
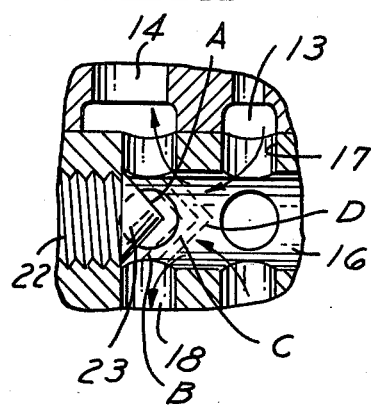
FIG. 2 is a fragmentary sectional view on an enlarged scale of a portion of the valve.

Referring to FIG. 2, in accordance with the invention, a member 22 is adjustably positioned in the axial passage 16 to provide a variable orifice between the axial passage 16 and the radial passages 18 in the spool. In its preferred form, the adjustable member 22 is threaded so that it is movable axially in the passage 16 and has a conical end 23. Fluid flowing from inlet 13 through passage 17 passes through the spool in the axial passage 16 and the orifice formed between the tip 23 of the adjustable member 22 and the radial passages 18. As shown in FIG. 2, the four inlet passages 17 are provided and are equally spaced circumferentially and four outlet passages 18 are provided and are spaced equally circumferentially, although at least one may be used. The number of passages may vary but are preferably symmetrically positioned.

By varying the position of the adjustable member 22, the flow through the valve or the pressure drop through the valve for any given position of the spool can be adjusted.

Figure 3:
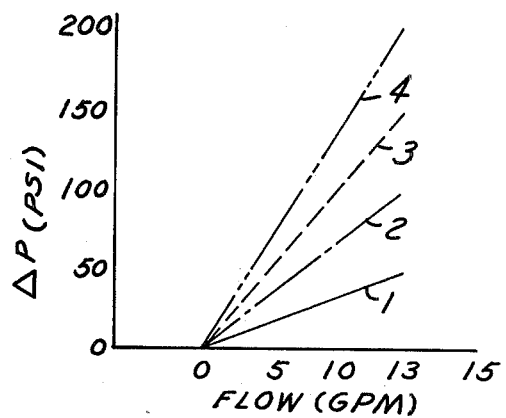
FIG. 3 is a graph of pressure drop versus flow.
Figure 4:
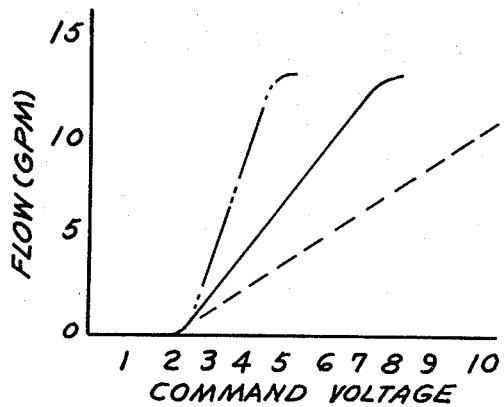
FIG. 4 is a graph of flow versus command voltage.

FIG. 3 shows the relationship of the pressure drop versus flow for different positions of the adjustable member relative to the spool. It can be seen that as the adjustable member is moved to successive positions A, B, C and D as shown in FIG. 2, the pressure drop ΔP versus flow increase along curves 1, 2, 3 and 4, respectively, in FIG. 3. The change in flow gain caused by different command voltages or signals is shown in the graph shown in FIG. 4. As the signal causes displacement of the spool, the flow increases. Thus, the adjusted position of the adjustable member 22 can be utilized to obtain predetermined flow, predetermined pressure drop or both to meet the requirements of the hydraulic system with which the valve is used without making major changes such as changing the spool or adding additional controls or devices.

Figure 5:
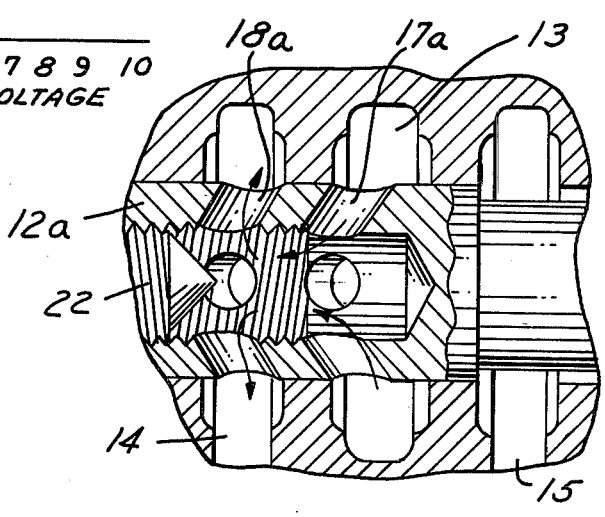
FIG. 5 is a fragmentary sectional view similar to FIG. 2 showing a modified form of valve.

In the form shown in FIG. 5, at least some of the radial passages 17a, 18a in the spool 12a are formed so that they have axes that are at an acute angle to the axis of the spool. By such an arrangement, an axial component of outlet flow and inlet is provided to nullify the spool closing forces that would be produced by a pure radial inlet or outlet flow. Such an arrangement permits the use of a smaller force motor such as a smaller solenoid to be used where minimal input signal is required and results in a more smooth and efficient performance. The angle which the axes of the passages make in the axis of the spool extends axially inwardly and away from the inlet passages toward the outlet passages which are being controlled and toward the solenoid.

Figure 6:
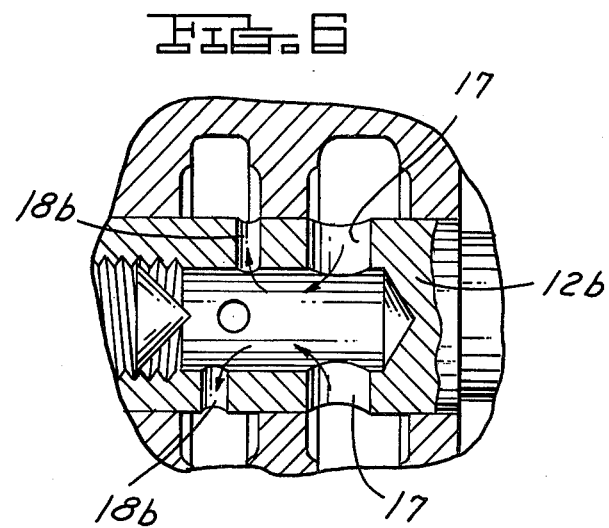
FIG. 6 is a fragmentary sectional view showing a further modified form of valve.
Figure 7:
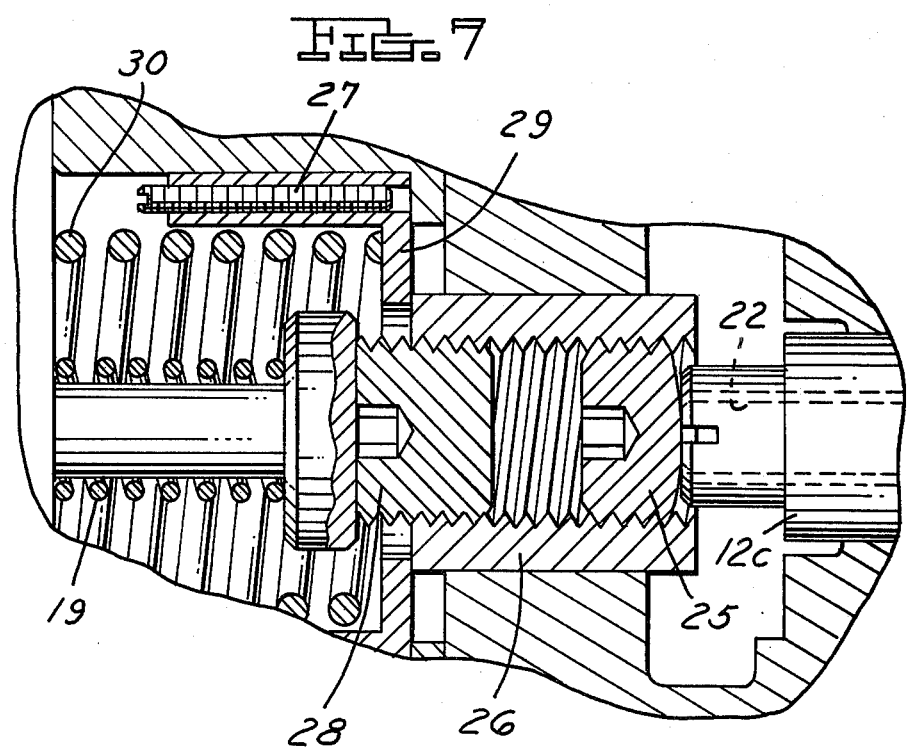
FIG. 7 is a fragmentary sectional view of a further modified form of valve.

In the form shown in FIG. 6, a plurality of outlet passages 18b are provided which have a smaller diameter than passages 18 or 18a but a total area substantially equal to the total area of the outlet passages 18 or 18a. In order that the passages 18b will provide a smooth functioning their outer ends are positioned within the confines of the width of outlet port 14 and overlap one another circumferentially.

Where it is desired to adjust the null position of spool 12, 12a or 12b, the arrangement shown in FIG. 7 can be used wherein the end of the spool 12c is engaged by a set screw 25 in an intermediate member 26 for adjusting the null or neutral position of the spool 12c. An adjusting screw 27 extends axially from a second intermediate member 29 and serves as a maximum travel stop. A second adjusting screw 28 on member 26 provides for adjustment of the movement of the plunger of the solenoid or force motor.

The forms of the invention heretofore described relate to a valve having a single solenoid but are applicable to a valve wherein the spool is movable by two solenoids as shown in FIG. 8. As shown in FIG. 8, the spool 12d is adapted to be moved by solenoid 21 as well as a solenoid 21a having a linear variable displacement transformer of LVDT. The spool 12d also includes a second adjustment screw 22 associated with the radial ports 31 in spool 12d so that by shifting the spool 12d in the opposite direction or to the right when solenoid 21 is energized, fluid is permitted to flow to outlet 15. As in the form shown in FIG. 1, the adjustable member 22 can be used to control flow, pressure drop or both. The passages 17, 18 may have their axes at an angle to minimize the force required to move the spool in the same manner as described in connection to FIG. 5.

It can thus be seen that there has been provided a directional valve that can be used to provide effective control of flow or pressure over a wide range without the necessity to make major changes in the valve or to add controls or devices; which can be used in various hydraulic systems; which has improved hysteresis and flow capacity; wherein the forces tending to close the valve are reduced so that less force is required to move and hold the valve in a predetermined position.

I claim:

1. A variable pressure drop proportional motor controlled hydraulic directional valve comprising
   a valve body,
   a cylindrical bore in said body,
   a cylindrical spool slideable in said bore,
   a force motor operatively connected to one end of said spool for moving said spool,
   said force motor comprising a servo solenoid having a plunger engaging the spool wherein the stroke of the plunger is proportional to the input current to the solenoid so that the position of the plunger relative to the body is determined by the magnitude of the input current,
   said body having a pressure inlet port extending to said bore,
   said body having spaced annular outlet ports extending to said bore on opposite sides of said pressure inlet port,
   said spool having an axial passage and at least two longitudinally spaced sets of generally radial passages such that when the spool is moved, one of said sets of said radial passages will provide communication from the pressure inlet port through said axial passage and the other set of radial passages to one of said outlet ports,
   and a member adjustably positioned axially in said spool for varying the area of flow to the other set of said radial passages so that the pressure drop between the axial passage and radial passages can be adjustably varied,
   said member having a conical end extending axially into said axial passage adjacent said other set of radial passages to define a variable area of flow from said axial passage to said other set of radial passages.

2. The variable pressure drop proportional motor controlled hydraulic directional valve set forth in claim 1 wherein said member is threaded axially into said spool.

3. The variable pressure drop proportional motor controlled hydraulic directional valve set forth in claims 1 or 2 wherein at least one of said passages has its axis perpendicular to the axis of the spool.

4. The variable pressure drop proportional motor controlled hydraulic directional valve set forth in claims 1 or 2 wherein at least one of said radial passages has an axis forming an acute angle with the axis of the spool and extending radially inwardly and axially toward the conical end of the member.

5. The variable pressure drop proportional motor controlled hydraulic directional valve set forth in claim 1 wherein at least some of said radial passages have axes forming an acute angle with the axis of the spool and extending radially inwardly and axially toward the conical end of the member.

6. The variable pressure drop proportional motor controlled hydraulic directional valve set forth in claim 1 wherein all of said last-mentioned radial passages have their axes forming an acute angle with the axis of the spool and extending radially inwardly and axially toward the conical end of the member.

7. The variable pressure drop proportional motor controlled hydraulic directional valve set forth in claim 1 including axially adjustable means interposed between the plunger of the solenoid and the spool for adjusting the null position of the spool relative to the solenoid.

8. The variable pressure drop proportional motor controlled hydraulic directional valve set forth in claim 7 wherein said axially adjustable means comprises an intermediate member engaging said plunger, a set screw threaded in said intermediate member and engaging said spool.

9. The variable pressure drop proportional motor controlled hydraulic directional valve set forth in claim 7 or 8 including means providing a stop for adjusting the maximum travel of the plunger.

10. The variable pressure drop proportional motor controlled hydraulic directional valve set forth in claim 1 including a second force motor operatively connected to the other end of said spool, said second force motor comprising a servo solenoid having a plunger engaging the spool wherein the stroke of the plunger is proportional to the input current to the solenoid so that the position of the plunger relative to the body is determined by the magnitude of the input current such that when the spool is moved by operation of the solenoid of said second force motor communication will be provided from the inlet passage through the other set of radial passages through said axial passage to the one set of radial passages to the other outlet port, a second member adjustably positioned in said spool and having a conical end extending axially into said axial passage adjacent the one set of radial passages to define a variable area from said axial passage to said one set of radial passages.

11. The variable pressure drop proportional motor controlled hydraulic directional valve set forth in claim 10 wherein at least some of said radial passages of said one set of radial passages have axes forming an acute angle with the axis of the spool and extending radially inwardly and axially toward the conical end of the member.

* * * * *